(12) United States Patent
Qiu et al.

(10) Patent No.: US 9,130,928 B2
(45) Date of Patent: Sep. 8, 2015

(54) ONLINE SECURE DEVICE PROVISIONING FRAMEWORK

(75) Inventors: Xin Qiu, San Diego, CA (US); Alexander Medvinsky, San Diego, CA (US); Stuart P. Moskovics, San Diego, CA (US); Jason A. Pasion, San Diego, CA (US); Eric J. Sprunk, Carlsbad, CA (US); Fan Wang, San Diego, CA (US); Ting Yao, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 287 days.

(21) Appl. No.: 13/087,847

(22) Filed: Apr. 15, 2011

(65) Prior Publication Data

US 2011/0258685 A1    Oct. 20, 2011

Related U.S. Application Data

(60) Provisional application No. 61/324,575, filed on Apr. 15, 2010.

(51) Int. Cl.
*H04L 29/06* (2006.01)
*G06F 21/57* (2013.01)

(52) U.S. Cl.
CPC .......... *H04L 63/0823* (2013.01); *G06F 21/572* (2013.01); *H04L 63/06* (2013.01); *H04L 2463/102* (2013.01)

(58) Field of Classification Search
CPC .............. H04L 63/06; H04L 63/0823; H04L 2463/102; G06F 21/572
USPC .............................................. 726/5; 713/176
See application file for complete search history.

(56) References Cited

U.S. PATENT DOCUMENTS 6,373,949 B1 *   4/2002  Aura ............................. 380/247
2006/0178132 A1 * 8/2006  Tammi et al. .................. 455/411

(Continued)

FOREIGN PATENT DOCUMENTS

CN        101316256 A     12/2008
EP         1249964 A2     10/2002

(Continued)

OTHER PUBLICATIONS

3GPP TS 22.016 V9.0.0 (Sep. 2009) 3rd Generation Partnership Project; Technical Specification Group Services and System Aspects; International Mobile station Equipment Identities (IMEI) (Release 9) © 2009 3GPP Organizational Partners (8 pages).*

(Continued)

*Primary Examiner* — Joseph P Hirl
*Assistant Examiner* — Thomas Gyorfi
(74) *Attorney, Agent, or Firm* — McDermott Will & Emery LLP

(57) ABSTRACT

A method for updating network-enabled devices with new identity data includes generating a plurality of new identity data records and loading the new identity data records onto an update server. A request is received at the update server for new identity data from at least one network-enabled device having a previously assigned identity linked to an identifier. The previously assigned identifier is linked to a new identifier that is linked to one of the new identity data records. One or more new identity data records are securely delivered to the network-enabled device.

28 Claims, 7 Drawing Sheets

(56) References Cited

U.S. PATENT DOCUMENTS

| | | | |
|---|---|---|---|
| 2008/0049942 A1 | 2/2008 | Sprunk et al. | |
| 2008/0130898 A1* | 6/2008 | Holtmanns et al. | 380/278 |
| 2008/0228828 A1 | 9/2008 | Teodorescu | |
| 2008/0271132 A1* | 10/2008 | Jokela et al. | 726/10 |
| 2009/0013078 A1* | 1/2009 | Bencheikh | 709/227 |
| 2009/0313252 A1 | 12/2009 | Gupta et al. | |
| 2009/0316909 A1 | 12/2009 | Futa et al. | |
| 2010/0100743 A1 | 4/2010 | Ali et al. | |
| 2010/0122315 A1 | 5/2010 | Stollman | |
| 2010/0332826 A1 | 12/2010 | Lin | |
| 2011/0060771 A1* | 3/2011 | Llorente et al. | 707/812 |
| 2011/0093516 A1 | 4/2011 | Geng et al. | |
| 2011/0107436 A1 | 5/2011 | Cholas et al. | |
| 2011/0131177 A1* | 6/2011 | Sheth et al. | 707/609 |
| 2011/0135088 A1 | 6/2011 | Rudland et al. | |
| 2011/0138177 A1 | 6/2011 | Qiu et al. | |
| 2012/0089839 A1 | 4/2012 | Qiu et al. | |
| 2012/0263298 A1* | 10/2012 | Suh et al. | 380/255 |

FOREIGN PATENT DOCUMENTS

| | | | |
|---|---|---|---|
| WO | WO 2008101544 A1 * | 8/2008 | |
| WO | WO 2010034879 A1 * | 4/2010 | |

OTHER PUBLICATIONS

PCT Search Report and Written Opinion, Re: Application #PCT/US2011/032788; Dec. 20, 2011.

Adams, et al., "Internet X.509 Public Key Infrastructure Certificate Management Protocol (CMP)", Network Working Group, The Internet Society, Sep. 2005.

* cited by examiner

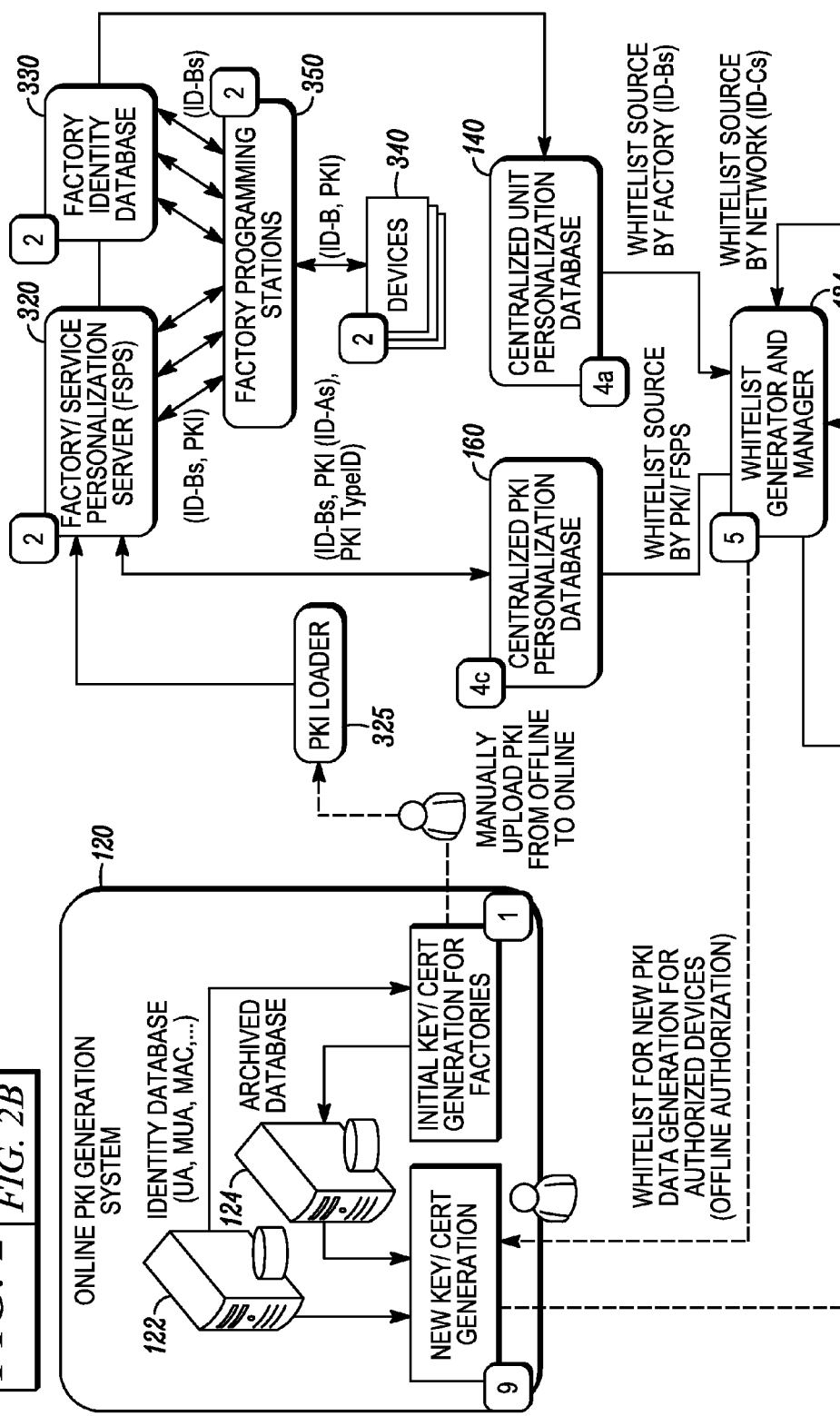

ONLINE SECURE DEVICE PROVISIONING FRAMEWORK

RELATED APPLICATIONS

This application claims priority from U.S. provisional application No. 61/324,575, filed Apr. 15, 2010, which is incorporated by reference herein in its entirety.

This application is related to co-pending U.S. application Ser. No. 12/961,455 filed on Dec. 6, 2010, entitled "Online Public Key Infrastructure (PKI) System."

BACKGROUND

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One standardized approach to today's digital security is referred to as the Public Key Infrastructure (PKI). PKI provides for use of digital certificates to authenticate the identity of a certificate holder, or to authenticate other information A certificate authority (CA) issues a certificate to a certificate holder and the holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event. Typically, a PKI certificate includes a collection of information to which a digital signature is attached. A CA that a community of certificate users trusts attaches its digital signature and issues the certificates to various users and/or devices within a system.

Network-enabled devices are generally provisioned at the factory with identity data so that they may communicate with other network-enabled devices in a secure manner using an identity data system. The identity data typically includes a public and private key pair and a digital certificate. Illustrative examples of networked-enabled device include, without limitation, PCs, mobile phones, routers, media players, set-top boxes and the like.

The identity data may be provisioned in network-enabled devices before or after they are deployed in the field For instance, the identity data may be incorporated into the device at the time of manufacture. For example, a large scale upgrade may occur when a network wants to replace their Digital Rights Management (DRM) system or when they want to support other security applications that require the network-enabled devices to be provisioned with new types of identity after the devices have been deployed. This can be a difficult and cumbersome process because it is often performed manually and therefore can require the devices to be returned to a service center.

SUMMARY

In accordance with one aspect of the invention, a method for updating network-enabled devices with new identity data is provided. The method includes generating a plurality of new identity data records and loading the new identity data records onto an update server. A request is received at the update server for new identity data from at least one network-enabled device having a previously assigned identity linked to an identifier. The previously assigned identifier is linked to a new identifier that is linked to one of the new identity data records. One or more new identity data records are securely delivered to the network-enabled device.

In accordance with another aspect of the invention, an identity management system is provided. The system includes an identity data generator configured to generate a plurality of new identity data records and a whitelist manager configured to (i) receive one or more identifiers associated with each of a plurality of network-enabled devices deployed for use in association with a network and (ii) produce a whitelist relating the one or more identifiers to each of the network-enabled device that are authorized to receive new identity data. At least one of the identifiers associated with each network-enabled device is a previously assigned identifier. The system also includes an update server configured to (i) receive the new identity data records from the identity data generator, (ii) receive requests for new identity data from the plurality of network-enabled devices (iii) authenticate each of the network-enabled devices and (iv); deliver a new identity data record to each one of the authenticated network-enabled device that are authorized to receive a new identity data record in accordance with the whitelist, said new identity data record being linked to the previously assigned identifier of the authenticated network-enabled device.

In accordance with yet another aspect of the invention, an identity data management system is provided which includes one or more databases storing at least two identifiers associated with a plurality of network-enabled device. A first and second of the two identifiers are identifiers of a first and second type, respectively. The system also includes a whitelist manager for receiving a first set of data specifying one or more of the network-enabled devices that are authorized to be updated with new identity data. The one or more network-enabled devices are identified in the first set of data by identifiers of the first type. The whitelist manager is configured to access the one or more databases to retrieve identifiers of the first and second type which correspond to the identifiers of the first type included in the first set of data and to establish a whitelist that includes corresponding identifiers of the first and second type and to deliver said whitelist to an identity data generator and to an update server. The system further includes an identity data generator configured to generate identity data records that are each identified by an identifier of the second type. The generated identity records are generated for network-enabled devices specified on the whitelist received from the whitelist manager. The identity data generator is further configured to associate the identity data records with the whitelist. The system also includes an update server configured to receive over a communications network a request for new identity data from a deployed network-enabled device. The update server is also configured to send the generated identity data records received from the identity data generator to the deployed network-enabled devices respectively identified by identifiers of the first type in the whitelist and in data received from the identity data generator.

BRIEF DESCRIPTION OF THE DRAWINGS

FIGS. 2A and 2B is a process flow diagram of one example of a PKI/identity update process when the deployed network-enabled devices are already provisioned with identity data that needs to be renewed, updated or supplemented with additional identity data.

DETAILED DESCRIPTION

An identity data management system is described herein which provides a flexible framework that can be used to upgrade, renew, or supplement identity data that is provisioned in a large base of network-enabled devices that have already been deployed in the field. The system architecture allows network operators to install and update the identity data in these devices without having to recall them from the end-user. The system architecture may also allow operators to update expired or expiring digital certificates provisioned in previously deployed network-enabled devices with minimum service disruption. In a common scenario, for instance, a service provider may have acquired, say, 500,000 units of a product that they have delivered to their end user customers. For one reason or another the service provider may wish to update the identity data in all or a subset (e.g., 100,000) of those units. In one particular instance the identity data is PKI data. In other cases the identity data may take a variety of other forms such as a serial number, a symmetric key that is cryptographic based, and the like. For purposes of illustration only and not as a limitation on the invention the following description will often refer to a PKI management system that is used to upgrade, renew, or supplement PKI data.

Figures 1, 1A, 1B:
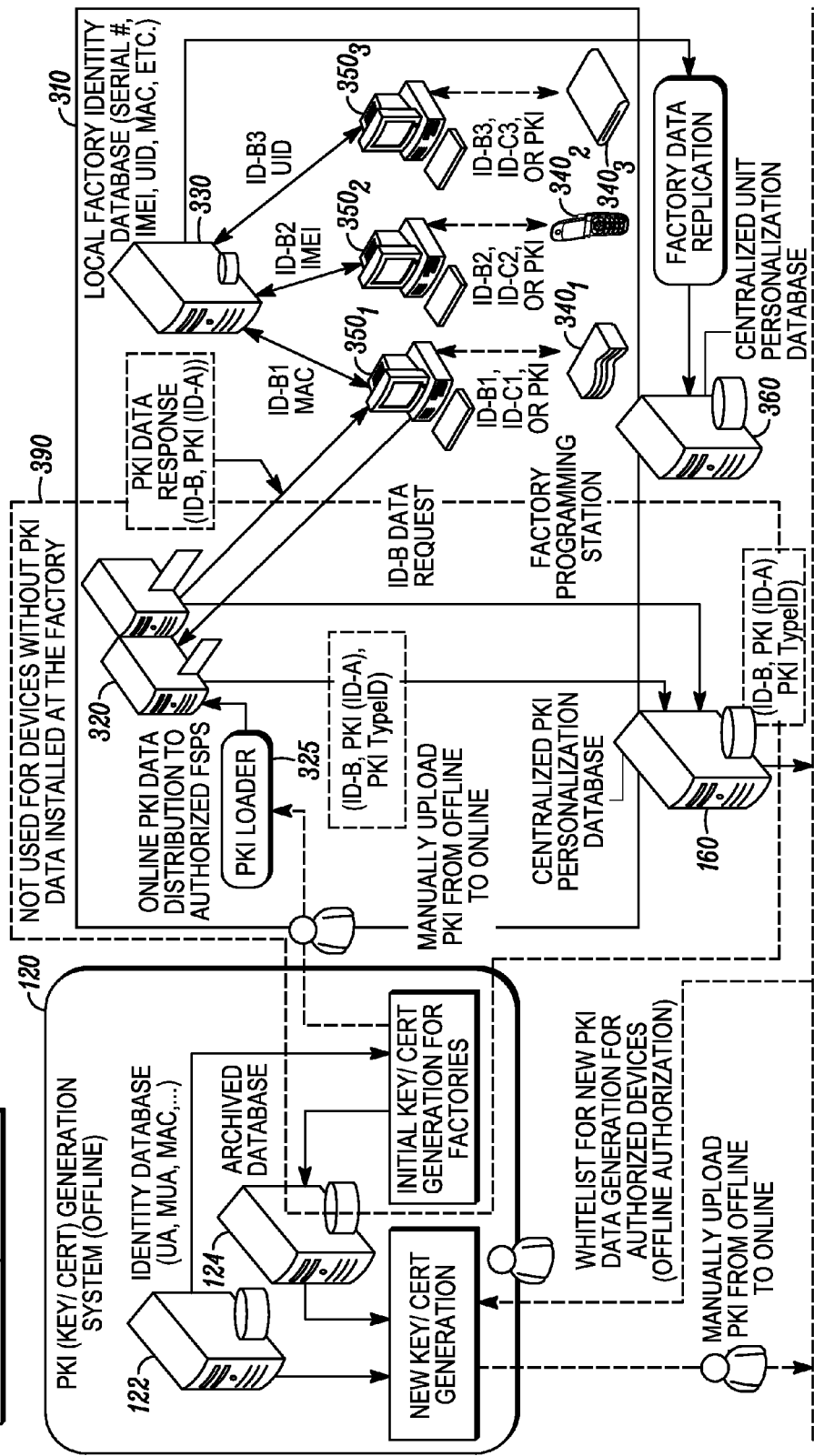
FIGS. 1A and 1B show one example of an operating environment in which the processes described herein for provisioning network-enabled devices with identity data may be implemented.
Figure 1B:
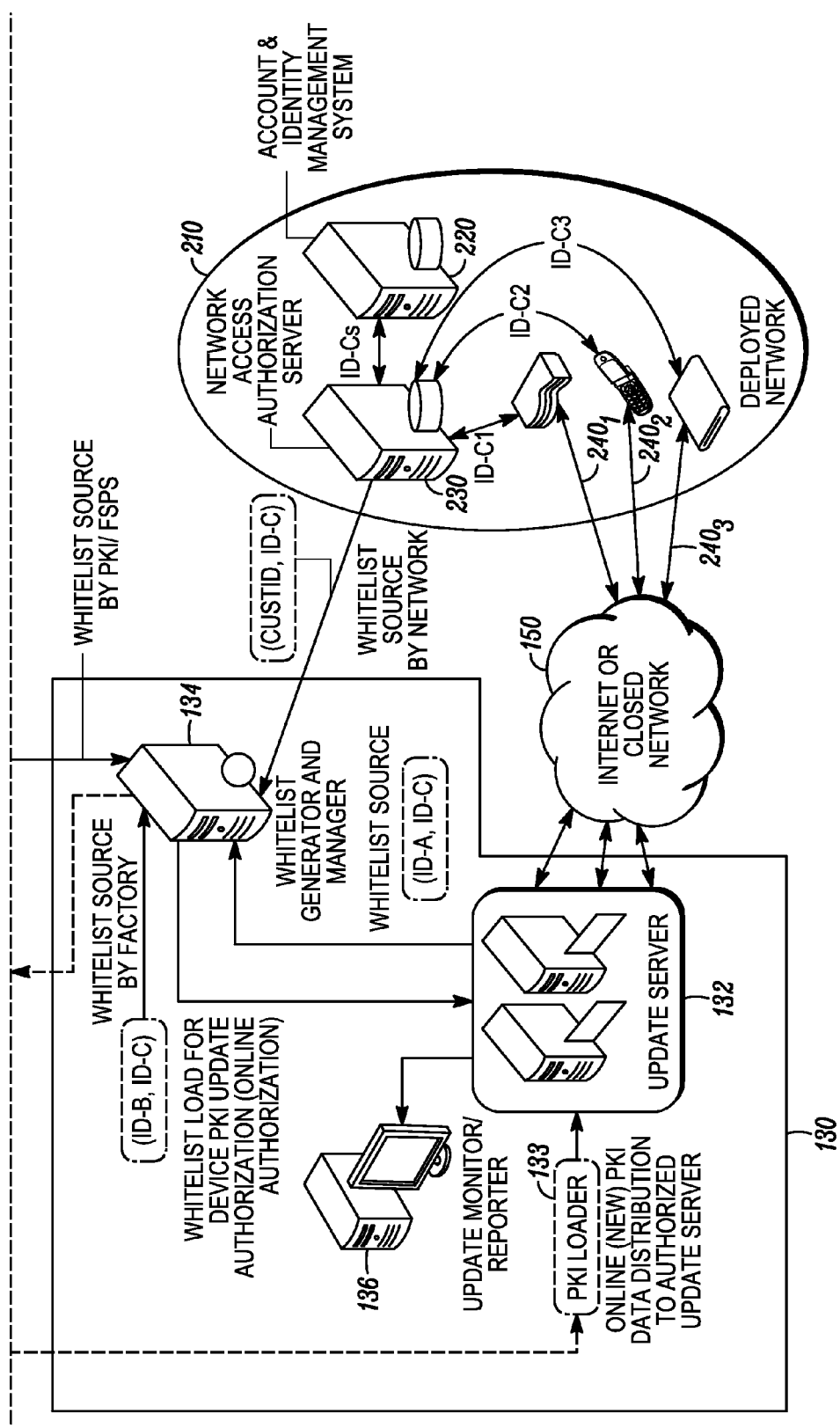

FIGS. 1A and 1B show one example of an operating environment in which the processes described herein for provisioning network-enabled devices with identity data may be implemented. This example shows a number of different domains representative of the different parties that may be involved in the data identity provisioning/update process. In this example three domains are shown: a factory domain 310 representing a manufacturing site for network-enabled devices; a deployed network domain 210 controlled by a network coordinator that operates the network in which the network-enabled devices are used; and a PKI/identity management system domain 120 operated by a PKI center operator. Although in general these domains may be maintained operated by the different entities, in some cases they may be operated by the same entities. For instance, the factory domain 310 and the PKI/identity management system domain 120 are sometimes under the control of the same entity.

It should be understood that each domain in FIGS. 1A and 1B is shown in a highly simplified manner in which a single entity (e.g., server, database, etc) may be representative of more complex arrangements and systems. For instance, as explained below, the factory domain includes a factory database 330 which is used to track components used in the manufacturing process, purchase and shipping orders, and so on. In reality, there may be many different systems and entities involved in this process, all of which are represented herein by factory database 330.

The manufacturing domain 310 of a single manufacturer may include multiple manufacturing sites which in some cases can be operated by a third party contract manufacturer distributed world-wide. Each factory, only one of which is illustrated in FIGS. 1 and 1B, may produce a single type or single class of network-enabled devices (e.g., mobile phones) or multiple classes of devices (e.g., mobile phones, routers and set-top boxes). FIGS. 1A and 1B show one illustrative manufacturing site, factory 310, which includes the aforementioned local factory database 330, factory programming stations 350 that allow factory personnel to access the factory database and the network-enabled devices $340_1$, $340_2$, and $340_3$ ("340") being produced, and factory servers 320 that are used to communicate with the PKI system 120 and store the PKI identity data received therefrom.

The network 210 includes a network access authorization server 230, which grants permission to the deployed network-enabled devices $240_1$, $240_2$, and $240_3$ ("240") to access the network and initiate upgrade operations. Identity data and other information concerning the deployed devices 240 are maintained by an account identity and management system 220.

In addition to the identity management components located at the factory site 310 discussed above, the PKI/identity management system includes two primary sub-systems: a PKI/identity generation system 120 and a PKI/identity update system 130. The PKI/identity generation system 120, which for security reasons is often an offline system, includes order fulfillment processors 122, which generate digital certificates or other identity data requested for products. The order fulfillment processors 122 may include, or have access to, hardware security modules (HSMs) in which the CA's certificate signing private keys and secure data may be stored for use by the system. The PKI/identity generation system 120 also includes an archive database 124, which is a database of records. These records may pertain to issued digital certificates, original requests for new digital certificates or secure data, audit data, organization information, product configurations, user information, and other record types as necessary.

The PKI/identity update system 130 includes a PKI/identity update server 132 that receives new identity data from the offline PKI/identity generation system 120 and securely downloads the new identity data to the appropriate deployed network-enabled devices 240. The PKI/identity update system 130 also includes a whitelist generation and manager (WGM) server 134 for consolidating various identities received from different whitelist sources maintained within the various domains, i.e., the PKI/identity generation system, the device manufacturer and the service provider/network operator. In particular, WGM server 134 receives one set of device identifiers from the factory via a centralized unit personalization database 360, which has all the data retrieved from different manufacturing sites and another set of device identifiers, one of which is assigned by the PKI/identity generation system 120, from centralized PKI personalization database 160. Other sources of whitelist data, either from network operators or update servers 132, will be discussed below. These identifiers and other data allow the WGM server 134 to correlate the various identifiers that are assigned to same network-enabled device.

The PKI/identity update system 130 also includes monitor and reporter system 136 that is used to monitor, track and report the progress and status of large volume upgrade operations, which can involve millions of network-enabled devices 240 across different networks and operators.

Before presenting in detail the process flow among the various domains and entities shown in FIGS. 1A and 1B, a high-level overview of the secure device provisioning process will be presented. At the outset, it should be noted that different domains may assign its own identifier which are to be associated with the network enabled devices, and these identities need to be tracked and correlated with one another in order to perform a PKI/identity update. In particular, the PKI center coordinator assigns an identifier, referred to herein as ID-A, to each PKI/identity data record that will ultimately be provisioned in a network-enabled device at the factory. If an identity data record includes a public-private key pair and a digital certificate, its ID-A will be included in the certificate. Likewise, the manufacturer assigns an identifier, denoted ID-B to each device 340 it manufactures. This identifier will often be in the form of a hardware-based identifier such as a MAC Address, an International Mobile Equipment Identity Number (IMEI) or a unit ID (UID), for example. In addition, the manufacturer may also assign another identifier, denoted ID-C, which may be in the form of a label such as a serial number or the like Unlike the other identifiers, the label will often be visible on the device itself. In part for this reason, the network operator will generally use the identifier ID-C within its own domain. In some cases the identifiers ID-B and ID-C may be the same.

When a network-enabled device is first provisioned with identity data, the PKI/identity generation system 120 generates the initial identity data for each device and delivers it to the factory servers 320. Each identity data record that is provided to the factory servers 320 includes its identifier ID-A. When the manufacturer is ready to first load a newly manufactured device with identity data, the factory stations 350 will request an identity data record by providing the factory servers 320 with the device's identifier ID-B. In response, the factory servers 320 will provide the factory stations 350 with an identity data record identified by its identifier ID-A. Both of these identifiers will be stored in the factory servers 320 and replicated to a centralized identity database 160, which associates both identifiers with one another to indicate that they relate to the same network-enabled device 340.

When an already deployed device 240 makes a request that requires it to be provisioned with a new identity data record, the network operator approves the request in accordance with its own internal procedures. In some cases permission to fulfill the request may be granted by the authorization server 230, which may provide a whitelist specifying those devices to be updated to the WGM server 134 associated with the PKI/identity update system 130. Instead of using an authorization server 230 to deliver the whitelist, the network operator may manually deliver the whitelist to the WGM server 134 over an online interface or the like.

Instead of coming from the network operator, in some cases the authorization may come from the factory, particularly when all the devices deployed to a particular network operator are to be upgraded. This authorization may be based, for instance, on a list of all devices shipped to the network operator. The whitelist that is provided includes the identifier used by the network operator, ID-C, for each device that is to be updated. The WGM server 134 obtains the identifiers ID-A, ID-B and ID-C from the various sources and joins them together into a single whitelist for subsequent distribution to the update server 132 and/or to the PKI/identity generation system 120. If the new identity data to be generated is based on/linked to the identifiers ID-A and/or ID-C, it should be protected by the key/certificate previously provisioned in the devices at the factory. In this case the whitelist is delivered from the WGM server 134 to the PKI/identity generation system 120, from which the previous IDs/keys/certificates can be retrieved to protect the new identity data that is generated. If, on the other hand, the new identity data to be generated is based on a new ID (ID-D) that is not associated with a previously generated/provisioned key/certificate, the PKI/identity generation system 120 generates the new identity data before update requests are received and thus does not need this information from the WGM server 134. In this case, the whitelist is directly sent to the update server 132 so that it can be used to check on the device authorization for the update.

Next, the devices 240 to be updated each send a request to the update server 132. The request is signed with a PKI key (or other types of keys such as symmetric keys and/or identifiers) previously installed at the factory. The PKI data-based mechanism provides a strong authentication of the request message, while a simple identity and/or symmetric key based mechanism provides for easy validation of authentication. The update server 132 first authenticates the device request message by validating its signature and certificate(s). Any invalid request will be rejected.

Using the appropriate identifier ID-C for each device 240 requesting an update, the PKI/identity update server 132 can perform the authorization check based on the whitelist it receives to ensure that only authorized devices are updated with the new PKI/identity data. The update server 132 also obtains the updated PKI identity data records from the PKI/identity generation system 120. The new PKI identity data records are specified by new identifiers ID-D, which may or may not be based on any of the previous identifiers (ID-A, ID-B, and ID-C). The association of the new and previous PKI/identity data determines how the authorization operation is conducted.

In one case, the new PKI/identity data (IDs and keys) are not related to the previous IDs/keys/certificates. In this case the PKI/identity generation system generates a sufficient pool of new PKI data with internally assigned new identifiers and uploads them to the update server 132 for use. The update server 132 simply checks whether or not a device ID (ID-C) in a request message is included in the whitelist. Each request message will be fulfilled with the next available new or unused PKI/identity data record stored in the update server 132. In general, one record will be used for one device, although it is possible that in some cases the same record could be shared among multiple devices. In this process, the update server 132 will pair the device ID-C with a new PKI/identity data record having the identifier ID-D. This online authorization and device binding process is used to ensure that all devices that are authorized to be upgraded will receive the new PKI/identity data.

On the other hand, if the new PKI/identity data (IDs and keys) are related to the previous IDs/keys/certificates, an offline generation and device binding process may be employed. In this case, the PKI/identity generator system 120 only generates the new IDs/keys/certificates for those devices whose IDs (ID-C) are included on the whitelist. The new identity data is then delivered to the update server 132. The update server 132 only has the new PKI/identity data for devices whose IDs (ID-Cs) are on the whitelist; any requests from devices having ID-Cs that are not on the whitelist will not be fulfilled. Finally, the new identity data records are delivered by the update server 132 to their respective devices 240 over a public or private network 150 such as the Internet, for example.

Figure 2B:
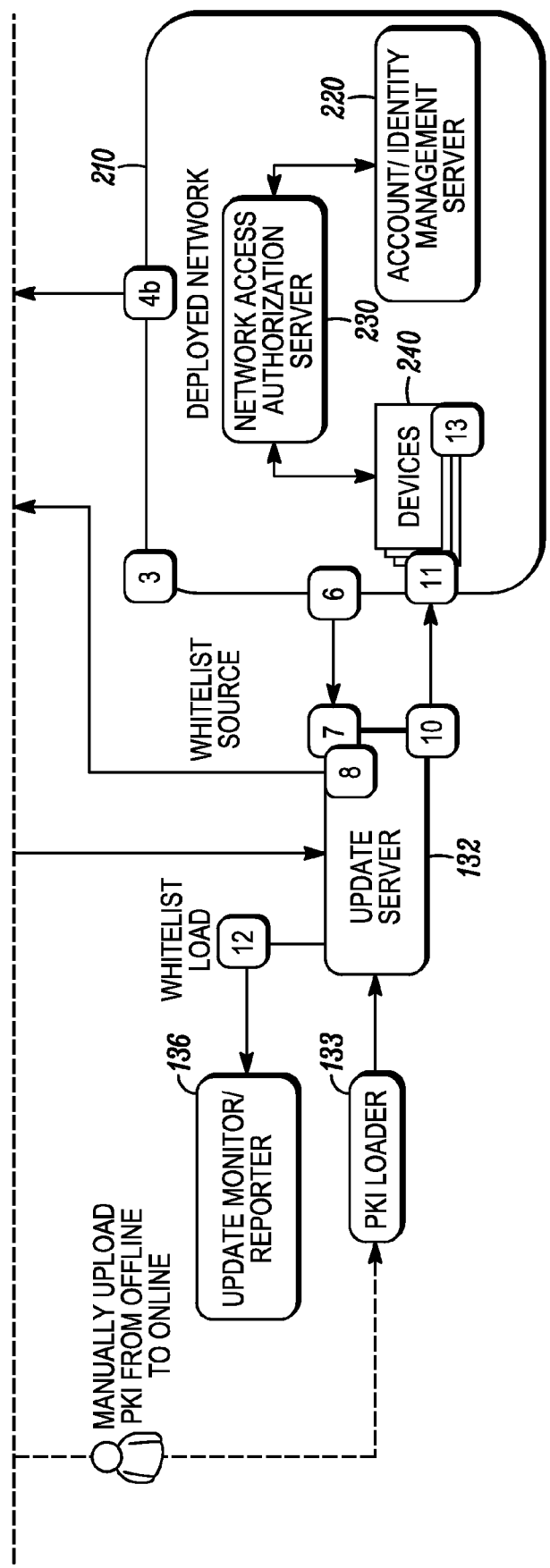
Figure 3A:
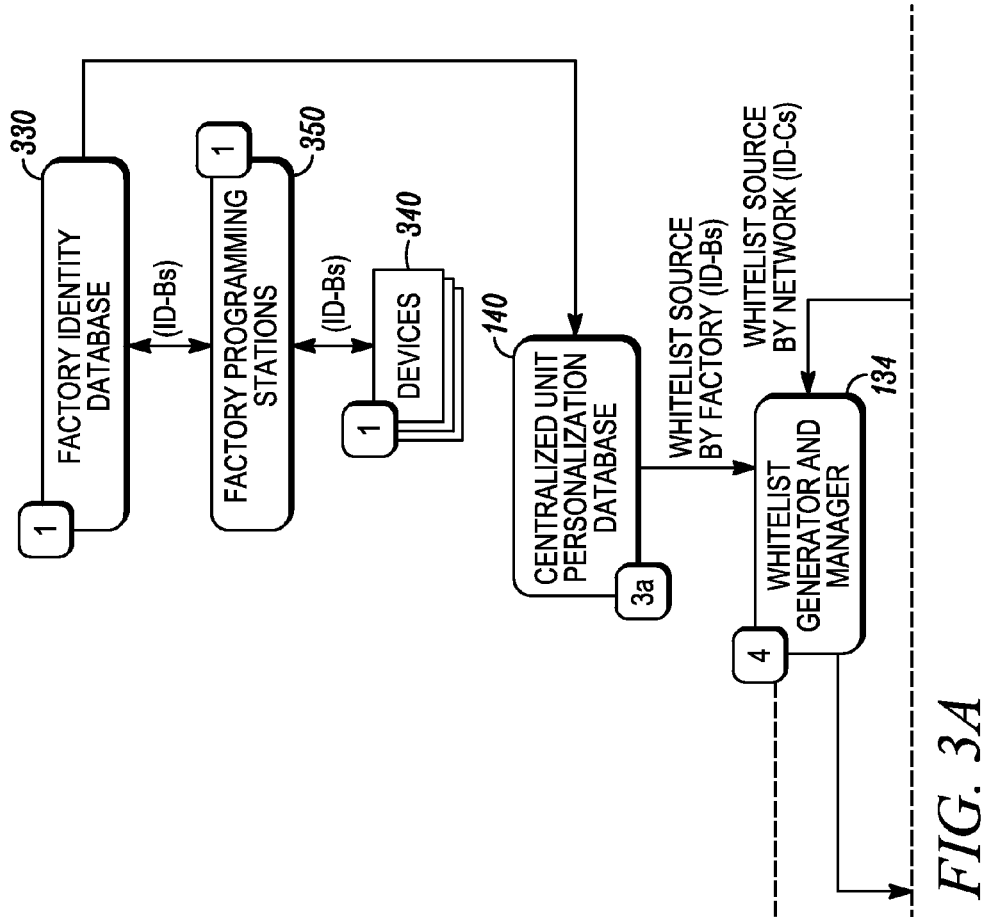
FIGS. 3A and 3B is process flow diagram of one example of a PKI/identity update process when the deployed network-enabled devices have not been previously provisioned with any known, trusted or accessible PKI data.
Figure 3A:
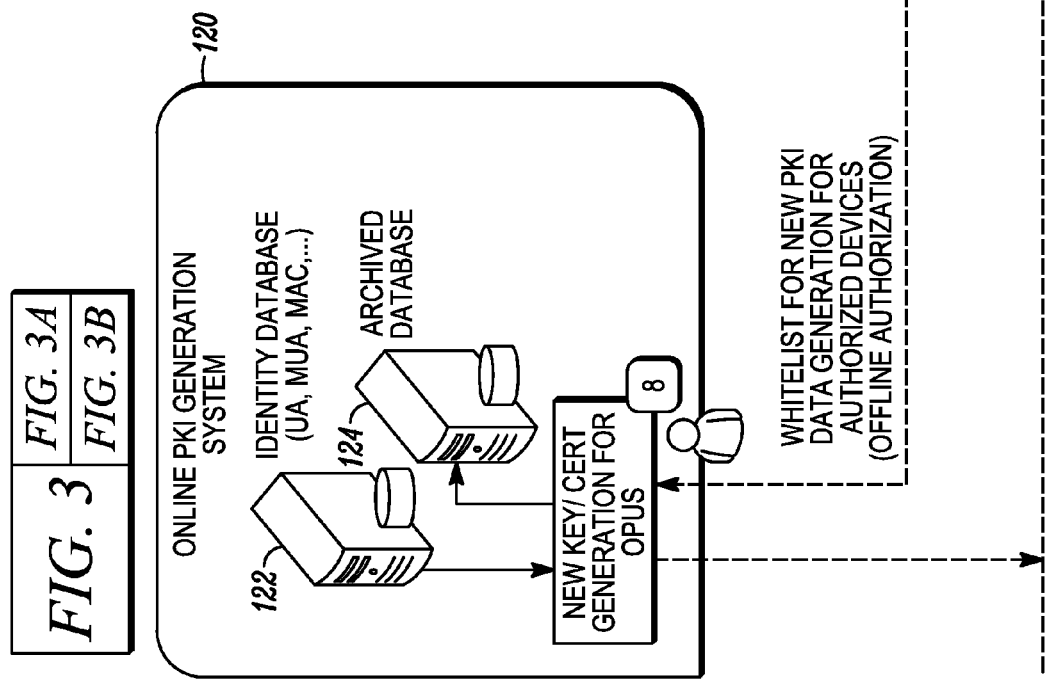
Figure 3B:
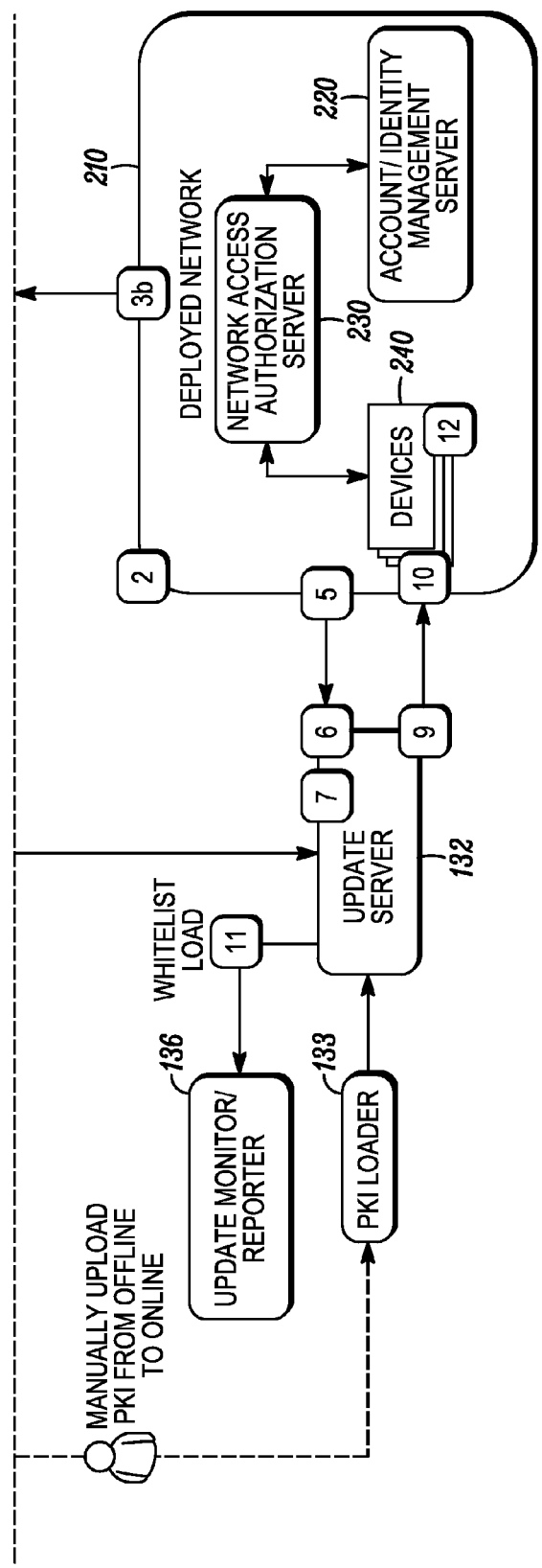

The PKI/identity update process described above will now be described in more detail using the process flow diagrams of FIGS. 2 and 3. FIGS. 2A and 2B show a case where the deployed network-enabled devices are already provisioned with identity data that needs to be renewed, updated or supplemented with additional identity data, whereas FIGS. 3A and 3B show a case where the deployed network-enabled devices have not been previously provisioned with any known, trusted or accessible PKI data. In FIGS. 1, 2 and 3, like elements are denoted by like reference numerals.

Referring to FIGS. 2A and 2B, the process starts at 1 when the PKI generation system 120 generates the initial identity data that is to be installed in manufactured devices at the factory. The identity data is also archived in the archived database 124.

The initial identity data records are assigned identifiers ID-As, which are maintained by the PKI/identity generation system 120. The identity data is delivered from the generation system to an online PKI loader 325, which loads the data onto the authorized factory servers 320. At 2, the devices are personalized with the initial identity data as follows. First, a network-enabled device 340 is assigned a device identifier ID-B, which may be a serial number, a Unit ID (UID), an IMEI number, or a MAC address. The identifiers ID-B are stored in a factory identity database 330 and assigned to factory programming stations, which in turn assign them to devices to be manufactured. The device is also assigned by the factory identity database 330 and programming station 350 with a second identifier, denoted ID-C, which may generally be a label or the like that typically will be used by the network operator. In some cases the identifiers ID-B and ID-C may be the same. The factory programming stations 350 at 2 request identity data from the factory servers 320. After the stations 350 connect to factory servers 320 and send requests for the identity ID-Bs of the devices 340 to be provisioned, the factory server 320 responds by providing the identity data denoted with the identifier ID-As.

The identity data provisioned in the devices may be used in connection with a particular service or set of services. Accordingly, if the device is authorized for multiple services or sets of services, the device may be provisioned with multiple identity data records. Each PKI/identity data type, denoted as PKI TypeID, could have different key/certificate formats, using different cryptography key/certificate generation mechanisms, and having different Certificate Authorities (CAs), etc.

At 3, the devices 340 are shipped from the domain of the factory 310 to the domain of the network 210 and the network operator deploys the devices 340 in their network. They are then authorized by the network operator to access the network and the identities of the deployed devices are stored in the account/identity management server 220.

Before any updates can be performed, various identifiers used during the initial personalization process and the network access authorization process need to be imported into and consolidated by the PKI/identity update system 130 in order for upgrade operations to be performed online with adequate security. First, at 4a, the centralized unit personalization database 360 collects the device identifiers (ID-B and ID-C) from the various local factory identity databases 330. The database 360 then uploads these device identifiers as one of whitelist sources to the WGM 134. In addition, at 4b, the network access authorization server 230 also uploads the list of devices 240 to be upgraded (as identified with the identifiers ID-Cs) to the WLGM 134. In some cases, when a network operator wants to upgrade all the devices in their network, this list of devices could be obtained directly from the factory, based on their shipment notice. At 4c the centralized PKI personalization database 160 collects various PKI personalization-related information (e.g., ID-A, ID-B, PKI Type ID) from the factory servers 320 via a PKI reaper 360, which aggregates the information from all the various factory servers at different factory locations.

Next, at 5, the WGM 134 consolidates all the identifiers and generates a whitelist for the PKI/identity generation system 120 or for the update server 132, depending on the various upgrade requirements defined by each customer (e.g. a network operator, a manufacturer, etc.) of the PKI/identity management system. The whitelist is provided to the PKI/identity generation system 120 in an offline manner for security purposes.

The request for an update is made directly by the devices 240 to the update server 132 at 6. The request message sent by each device 240 is signed with a PKI key previously installed at the factory and identified with ID-A. Upon receiving the request at 7, the update server 132 first authenticates the device request message by validating its signature and certificate(s). Any invalid request will be rejected. Then, at 8, the update server 132 performs an authorization check to ensure all the authenticated devices are in fact authorized to be updated with new identity data. This authorization check may be performed in one of two ways, depending on the whitelist configuration. First, authorization may be performed using an online authorization and device binding process. Alternatively, an offline generation and device binding process may be employed.

Meanwhile, at 9, the offline PKI/identity generation system 120 generates the new identity data. This can be accomplished in one of two ways, depending on whether the whitelist is defined. First, when a whitelist is defined and imported, a new identity data record can be generated based on information specified in the whitelist. This information generally includes one of the device identifiers and the PKI Type ID.

The new identity data can be encrypted by a previously installed key whose certificate has an identifier (ID-A) that is paired in the whitelist with the device ID, which could be either ID-B or ID-C. In order to obtain the previously installed key, the previously generated identity data will first need to be retrieved from the archived database 124. After this encryption operation, the new identity data records with the specified new PKI Type ID are bound to their corresponding devices based on the whitelist of deployed devices 240 that are authorized to be updated. Encryption of the new identity data may be performed before a request for new identity data is received (e.g., at the time the new identity data is generated) or only when a request for new identity data is received.

If new identity data does not need to be identified by any of the existing identifiers of the deployed device, the offline PKI/identity generation system 120 independently generates a sufficiently large pool of new identity data records of a specific PKI type (based on a new identifier, denoted ID-D, which is assigned internally) and uploads it into the update server 132 via a PKI loader 133. In this case the new identity data is generated during the key generation process, but for any specific device. When a new identity data update request is received by the update server 132, the "next available" new identity data record is used. In this case the binding of the new identity data with the devices 240 takes place in the update server 132 based on the designated whitelist available to it.

Regardless of how the new identity data is generated, the update server 132 receives the new identity data from the PK/identity generation system 120 and responds to the update request by providing the new identity data at 10 to the deployed network-enabled devices over network 150. At 11, the deployed devices 240 decrypt, validate and install the new identity data. In addition, at 12, the monitor and report system 136 keeps track of the overall data usage and operational status of the system.

In some cases a network-enabled device 240 that has already been authorized to receive an update may retry, at 13, sending its request to obtain an update using the same device identifier. This can be necessary, for example, as a result of network outages, an accidental device reset, a reset of the network access authorization server 230, etc. If the update server 132 receives such a request, it first checks to see if any limitations on a retry (either based on number or time) have been exceeded and, if so, it rejects the retry request. If a retry request is allowed, the update server 132 retrieves exactly the same set of identity data that was previously sent to that same device 240, which has already been bound to its factory device identity. This same set of identity data is returned to the device 240 in response to a retry request.

Referring now to FIGS. 3A and 3B, a process flow diagram is presented for those cases where the deployed network-enabled devices have not been previously provisioned with any PKI data. The process may also applicable to cases where a factory installed certificate has already expired and therefore cannot be used or to cases where devices are made by a party whose PKI/data cannot be trusted and/or is inaccessible.

The process of FIGS. 3A and 3B begins at 1 when the network-enabled devices 240 are assigned an identifier at the factory, which will once again be denoted ID-B. At 2, the devices are shipped from the domain of the factory 310 to the domain of the network 210 and the network operator deploys the devices 340 in their network. The network operator may assign an access account to the deployed devices 340, denoted as identifier ID-C, which may be retrieved from its own network access authorization server 230. In some cases the identifiers ID-B and ID-C may be the same. As in the case of FIGS. 2A and 2B, before any updates can be performed, various identifiers need to be imported into and consolidated by the PKI/identity update system 130 in order for update operations to be performed online with reasonable security. First, at 4a, the centralized unit personalization database 360 collects the device identifiers (ID-B and ID-C) from the various local factory identity databases 330. The database 360 then uploads these device identifiers as a source of whitelist data to the WGM 134. In addition, at 3b, the network access authorization server 230 also uploads the list of devices 240 to be upgraded (as identified with the identifiers ID-Cs) to the WLGM 134.

Next, at 4, the WGM 134 consolidates all the identifiers and generates a whitelist for the update server 132 and/or for the offline PKI/identity generation system 120, depending on the various upgrade requirements defined by each customer (e.g. a network operator, a manufacturer, etc.) of the PKI/identity management system.

The request for an update is made directly by the devices 240 to the update server 132 at 5. Upon receiving the request at 6, the update server 132 first authenticates the device request message. Any invalid request will be rejected. The request message is "authenticated" based on identifier(s) previously installed at the factory. Since there is no PKI data present, the "authentication" mechanism will not be as strong as when PKI data is present. A symmetric key-based or a public key based (such as one derived from the Diffie Hellman algorithm with a pre-determined and secret prime modulus p and base generator g at both the device and the update server, for example) authentication could be used.

Then, at 7, the update server 132 performs an authorization check to ensure all the authenticated devices are in fact authorized to be updated with new identity data. This authorization check may be performed in one of two ways, depending on the whitelist configuration. First, authorization may be performed using an online authorization and device binding process. Alternatively, an offline generation and device binding process may be employed.

Meanwhile, at 8, the offline PKI/identity generation system 120 generates the new identity data. This can be accomplished in one of two ways, depending on whether the whitelist is provided. First, if a whitelist is provided, a new identity data record can be generated based on the device identifiers and the PKI Type ID in the whitelist. The newly generated PKI data are then bound to devices with their identifiers embedded in the new certificate. The new PKI data cannot be encrypted with a previously installed PKI data since none is installed initially. Thus, a different mechanism will be needed to protect the new PKI data. A symmetric key based encryption could be used. For instance, the symmetric key could be derived from the device identifier and/or a network identifier as well as other system parameters.

If no whitelist is provided to the offline PKI//identity generation system 120, the system 120 independently generates a sufficiently large pool of new identity data records of a specific PKI type (based on a new identifier, denoted ID-D, which is assigned internally) and uploads it into the update server 132 via a PKI loader 133. In this case the new identity data is not generated during the key generation process to match any specific device. When a new identity data update request is received by the update server 132, the "next available" identity data record is used. In this case the binding of the new identity data with the devices 240 takes place in the update server 132 based on the designated whitelist available to it.

Regardless of how the new identity data is generated, the update server 132 receives the new identity data from the PKI/identity generation system 120 and responds to the update request by providing the new identity data at 9 to the deployed network-enabled devices over network 150. At 10, the deployed devices 240 decrypt, validate and install the new identity data. However, the validation and decryption of the new PKI data cannot be PKI-based since no previous PKI data is available. Accordingly, other mechanisms will need to be used.

At 11, the monitor and report system 136 keeps track of the overall data usage and operational status of the system.

In some cases a network-enabled device 240 that has already been authorized to receive an update may retry, at 13, sending its request to obtain an update using the same device identifier. This can be necessary, for example, as a result of network outages, an accidental device reset, a reset of the network access authorization server 230, etc. If the update server 132 receives such a request, it first checks to see if any limitations on a retry (either based on number or time) have been exceeded and, if so, it rejects the retry request. If a retry request is allowed, the update server 132 retrieves exactly the same set of identity data that was previously sent to that same device 240, which has already been bound to its factory device identity. This same set of identity data is returned to the device 240 in response to a retry request.

Figure 4:
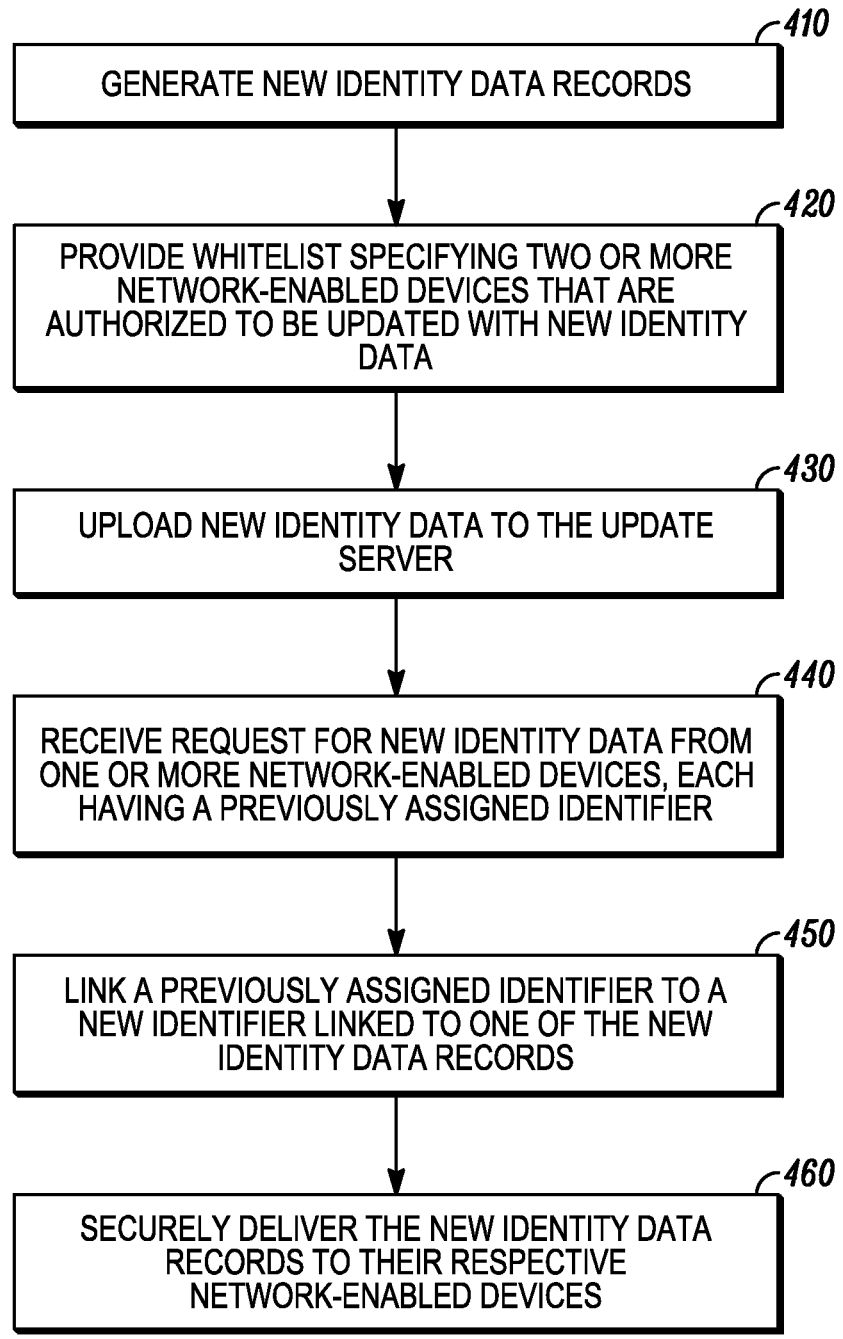
FIG. 4 shows one illustrative example of a method for updating network-enabled devices with new identity data.

FIG. 4 shows one illustrative example of a method for updating network-enabled devices with new identity data. The method includes the step of generating a plurality of new identity data records (step 410). In addition, a whitelist is provided which specifies two or more network-enabled devices that are authorized to be updated with new identity data (step 420). In some instances the devices are authorized for the update by a network operator. In some cases the network operator may request that all devices deployed in its network by updated with new identity data. Alternatively, the network operator can target selected devices that should be updated. For instance, the network operator may request that all devices of a certain model type be updated. Similarly, the network operator can target selected devices by any other criterion or criteria, such as all devices used by a certain customer or all devices deployed in a certain geographic region, for example. In any case, at some point after the identity data records are generated, they are uploaded to an update server (step 430). In addition, the update server receives a request for new identity data from one or more network-enabled devices, each having a previously assigned identity (step 440). Either before or after the new identity data records are uploaded to the update server, they are each linked to a new identifier, which itself is linked to one of the new identity data records (step 450). Finally, the new identity data records are securely delivered to their respective network-enabled devices.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method for updating network-enabled devices with new identity data, comprising:
   collecting a first identifier for each network-enabled device from a first database and a second identifier for each network-enabled device from a second database;
   consolidating into a whitelist the first and second identifiers associated with network-enabled devices that are authorized to be upgraded with new identity data;
   generating a plurality of new identity data records;
   encrypting the plurality of new identity data records at an identity generation system that is separate from the network-enabled devices using a key previously installed in each respective network-enabled device to produce encrypted new identity data records;
   loading the encrypted new identity data records onto an update server;
   receiving at the update server a request for new identity data from at least one network-enabled device having a previously assigned identity linked to the first identifier;
   authorizing the at least one network-enabled device for the new identity data based on the whitelist;
   linking the previously assigned identifier to a new identifier linked to one of the encrypted new identity data records; and
   securely delivering one or more encrypted new identity data records to the network-enabled device.

2. The method of claim 1 wherein the devices in the plurality of network-enabled devices authorized to be upgraded are authorized to be updated with new identity data by a service provider, said plurality of network-enabled devices being a subset of all network-enabled devices serviced by the service provider.

3. The method of claim 2 wherein the devices in the subset of all devices are all of a common type.

4. The method of claim 1 wherein the devices in the plurality of devices to be upgraded are devices whose respective users requested an update.

5. The method of claim 1 wherein the devices in the plurality of devices to be upgraded receive authorization to be updated based on one or more factors selected from the group consisting of device customer, device type, and a region where authorized devices are deployed.

6. The method of claim 1 wherein generating the new identity data record is performed for a specific network-enabled device based on the previously assigned identifier for the specific network-enabled device.

7. The method of claim 1 wherein encrypting the new identity data is performed before the request for new identity data is received.

8. The method of claim 1 wherein encrypting the new identity data is performed when the request for new identity data is received.

9. The method of claim 8 wherein the network-enabled device has a plurality of previously assigned identifiers, an identifier associated with a first encryption type being linked to identity data previously installed on the network-enabled device, the identifier associated with the first encryption type being linked with a previously installed identity data record.

10. The method of claim 9 wherein the new identifier is an identifier associated with a second encryption type, the identifier associated with the second encryption type being extracted from the network-enabled device and stored in a database during factory provisioning.

11. The method of claim 9 further comprising loading a whitelist onto the update server, said whitelist including a previously assigned identifier associated with the first encryption type for each of the network-enabled devices that are authorized to be provisioned with new identity data and a previously assigned identifier associated with the second encryption type for each of the one or more of the network-enabled devices that are authorized to be provisioned with new identity data.

12. The method of claim 11 further comprising establishing the whitelist by correlating a previously assigned identifier associated with third encryption type for each of the network-enabled devices authorized to be provisioned with respective ones of the identifiers of the first and second encryption types and further comprising tracking device inventory based on the previously assigned identifier associated with the third encryption type.

13. The method of claim 12 wherein the identifier associated with the third encryption type is used as the new identifier.

14. The method of claim 1 wherein the identity data includes a device digital certificate chain and a private key.

15. An identity management system, comprising:
an identity data generator, separate from a plurality of network-enabled devices configured to generate a plurality of new identity data records and encrypt the new identity data records using a key previously installed in each of the plurality of network-enabled devices to produce encrypted new identity data records;
a whitelist manager configured to (i) receive two or more identifiers associated with each of the plurality of network-enabled devices deployed for use in association with a network, the two or more identifiers received from different entities, an identifier associated with a first encryption type being received from a first entity indicating that the network-enabled device associated with the identifier is authorized to receive new identity data and (ii) produce a whitelist relating the two or more identifiers to each of the network-enabled device that are authorized to receive new identity data, wherein at least one of the identifiers associated with each network-enabled device is a previously assigned identifier;
an update server configured to (i) receive the new identity data records from the identity data generator, (ii) receive requests for new identity data from the plurality of network-enabled devices (iii) authenticate each of the network-enabled devices and (iv); deliver an encrypted new identity data record to each one of the authenticated network-enabled device that are authorized to receive a new identity data record in accordance with the whitelist, said new identity data record being linked to the previously assigned identifier of the authenticated network-enabled device.

16. The identity management system of claim 15 wherein the update server is further configured to bind the previously assigned identifier to the new identity data record based on the whitelist.

17. The identity management system of claim 15 wherein the identity data generator is further configured to bind the previously assigned identifier to the new identity data record based on the whitelist.

18. The identity management system of claim 15 wherein the authorization of network-enabled devices to receive new identity data is based on the whitelist.

19. The identity management system of claim 15 wherein the previously assigned identifier linked to the new identity data record is an identifier assigned by a device manufacturer.

20. The identity management system of claim 15 wherein the previously assigned identifier linked to the new identity data record is an identifier assigned by a network operator who deployed the network-enabled devices.

21. The identity management system of claim 15 wherein the first entity is a network operator who deployed the network-enabled device.

22. The identity management system of claim 21 wherein a second of the two or more identifiers are received from a manufacturer of the network-enabled device.

23. An identity data management system, comprising:
two or more databases storing at least two identifiers associated with a plurality of network-enabled devices, a first and second of the two identifiers being identifiers of a first and second encryption type, respectively, a first database of the two or more databases storing the first identifiers, a second database of the two or more databases storing the second identifiers;
a whitelist manager for receiving a first set of data specifying one or more of the network-enabled devices that are authorized to be updated with new identity data, wherein the one or more network-enabled devices are identified in the first set of data by identifiers of the first encryption type, wherein the whitelist manager is configured to access the first and second databases to retrieve identifiers of the first and second encryption type which correspond to the identifiers of the first encryption type included in the first set of data and to establish a whitelist that includes corresponding identifiers of the first and second encryption type and to deliver said whitelist to an identity data generator and to an update server;
an identity data generator, separate from the plurality of network-enabled devices, configured to generate identity data records that are each identified by an identifier associated with the second encryption type, said generated identity records being generated for network-enabled devices specified on the whitelist received from the whitelist manager, wherein the identity data generator is further configured to associate the identity data records with the whitelist and encrypt the identity data records using a key previously installed in each of the network-enabled devices specified on the whitelist to produce encrypted new identity data records; and
an update server configured to receive over a communications network a request for new identity data from a deployed network-enabled device, and, said update server being further configured to send the encrypted new identity data records to the deployed network-enabled devices respectively identified by identifiers of the first encryption type in the whitelist and in data received from the identity data generator.

24. The identity data management system of claim 23 wherein the plurality of network-enabled devices are associated with at least three identifiers, the whitelist manager being further configured to establish the whitelist so as to include an identifier associated with a third encryption type associated with each of the network-enabled devices.

25. The identity data management system of claim 23 wherein the identity data records and the data specifying identifiers of the second encryption type are both received from the identity data generator in an off-line manner.

26. At least one non-transitory computer-readable medium encoded with instructions which, when executed by a processor, performs a method for updating network-enabled devices with new identity data, each of said network-enabled devices having at least two encryption types of identifiers associated therewith, comprising:
receiving over a communications network a plurality of requests for new identity data for a plurality of network-enabled devices, each of said requests including an identifier associated with a second encryption type associated with the network-enabled devices;
obtaining an identifier associated with a first encryption type associated with each of the network-enabled devices, said first identifier encryption type being an identifier that is included in identity data with which the network-enabled device is currently provisioned, wherein the network-enabled devices have previously been provisioned with identifiers of the first encryption type by respectively assigning the identifiers of the first encryption type to network-enabled devices that are already identified by identifiers of the second encryption type;

receiving new identity data assigned with new identifiers of the second encryption type, wherein each of the new identifiers is matched with a corresponding identifier associated with the first encryption type;

encrypting the new identity data at an identity generation system that is separate from the network-enabled devices using a key previously installed in each of the network-enabled devices to produce encrypted new identity data;

delivering over the communications network the encrypted new identity data to respective ones of the network-enabled devices in accordance with their respective second identifiers.

27. The computer-readable medium of claim 26 further comprising receiving a whitelist to obtain the identifier associated with the first encryption type and to receive the new identifier matched with the corresponding identifier associated with the first encryption type, said whitelist providing authorization to provision the network-enabled devices with new identity data.

28. The computer-readable medium of claim 27 further comprising establishing the whitelist by correlating a previously assigned identifier associated with a third encryption type for each of the network-enabled devices authorized to be provisioned with respective ones of the identifiers of the first and second encryption types and further comprising tracking device inventory based on the previously assigned identifier associated with the third encryption type.

* * * * *